Dec. 19, 1933.   C. B. HANSEN   1,940,086
INTERLOCKING JOINT FOR SECTIONAL CONSTRUCTION
Filed Aug. 26, 1932    2 Sheets-Sheet 1
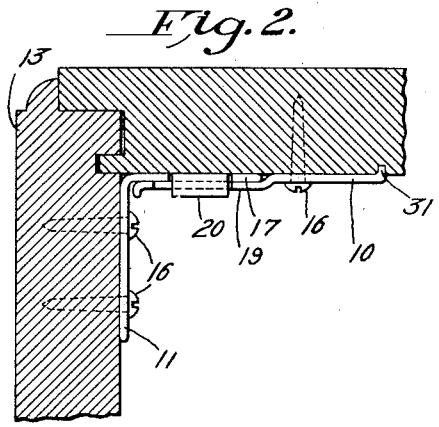
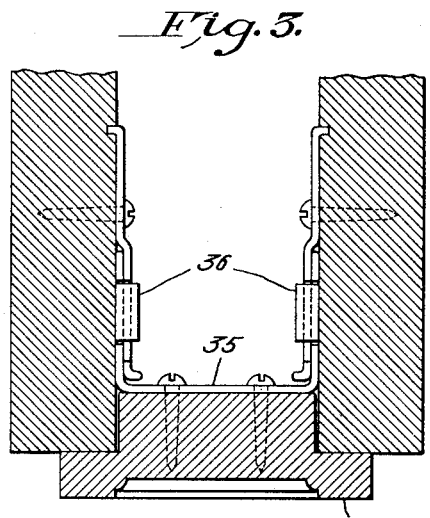
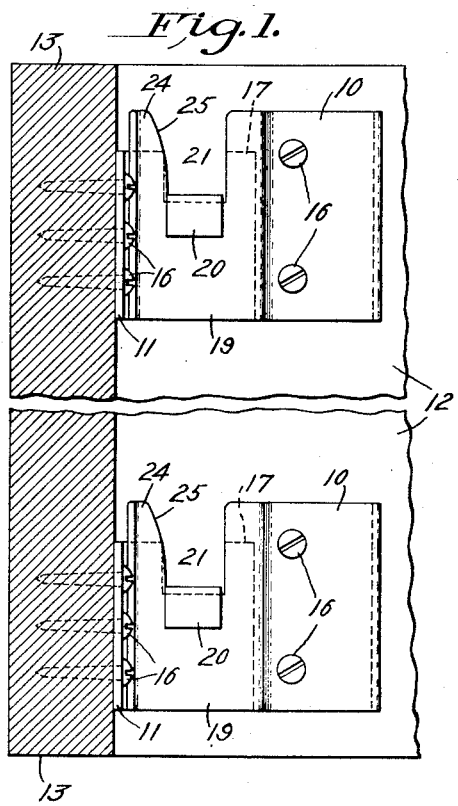
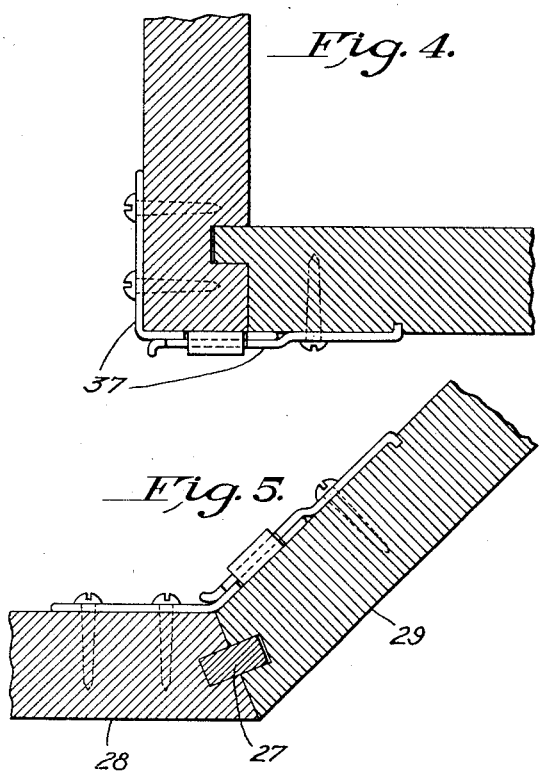
Inventor
Conwall B. Hansen
By Attorneys
Nathan, Bowman & Helfrich Dec. 19, 1933.   C. B. HANSEN   1,940,086
INTERLOCKING JOINT FOR SECTIONAL CONSTRUCTION
Filed Aug. 26, 1932   2 Sheets-Sheet 2
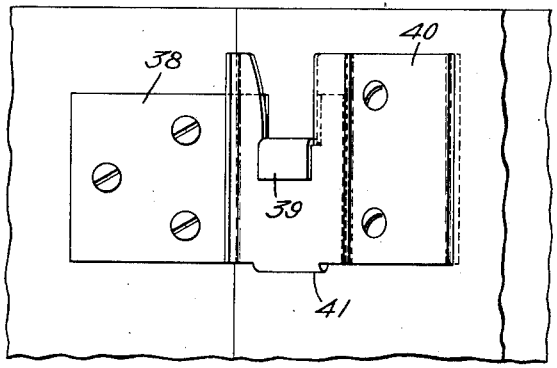
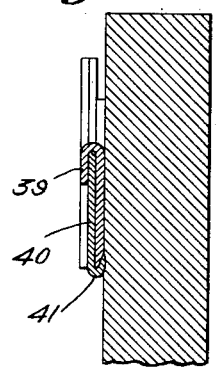
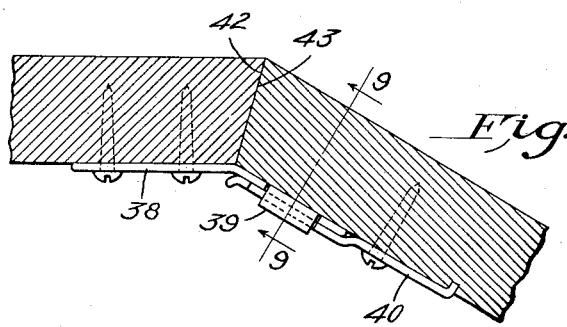
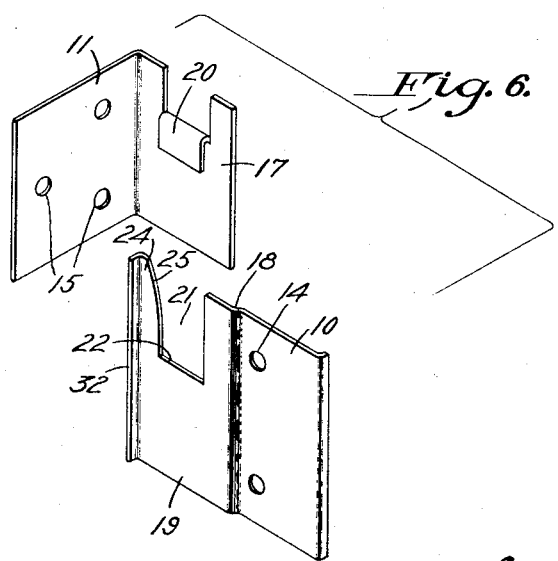
Inventor
Conwall B. Hansen
By Attorneys
Nathan, Bowman + Helfrich Patented Dec. 19, 1933

1,940,086

UNITED STATES PATENT OFFICE 1,940,086

INTERLOCKING JOINT FOR SECTIONAL CONSTRUCTION

Conwall B. Hansen, Brooklyn, N. Y.

Application August 26, 1932. Serial No. 630,570

10 Claims. (Cl. 20—92)

This invention relates to an interlocking joint for sectional construction work. It proposes a joint capable of utilization in a great variety of environments where it is desirable to assemble structural sections in a manner which may be termed temporary in the sense of enabling the construction, as a whole, to be quickly assembled and disassembled without resorting to nails, screws, bolts, or such like expedients and auxiliary devices.

The arrangement presented by this invention is particularly advantageous in not requiring any auxiliary plates or elements; but necessitates only the structural sections being juxtaposed whereupon they may quickly be secured together by a relative sliding movement.

The elements of the joint are of simple construction and may be economically manufactured from thin metal material by a common metal working operation such as that of stamping.

Upon assembly the joint presents a compound interlocking relation effective to secure the sections together in an exceptionally rigid manner. Primary among the details of construction which achieve such results are those of a flat hook portion on one of the mating plates which engages over an edge of the opposed plate to hold initially the plates in face to face contact. The opposed plate presents a slot or recess into which the hook projects, one edge of which recess is inclined to form a wedge. As the plates and thereby the sections are slid into engagement the hook portion is of necessity forced down the inclined edge causing the plates to slide laterally on their contacting faces, if necessary, and bringing the two sections into firm wedged engagement. A compound locking means is thereby presented in which the hook engagement prevents displacement of the sections in one direction, and the tongue having the inclined edge prevents separation in the transverse direction.

A more extended application and embodiment of the principles of the invention comprises a construction in which the hook means is incorporated in both plates. In accordance therewith each of the mating plates has a flat hook which engages over an edge of the respective opposed plate. The hooks are arranged in opposed relation and result, therefore, in locking the plates together on opposite edges. The inclined edge draws the sections together in a direction parallel to the contacting plate as before.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views of which:—

Figure 1 is a broken figure showing the device in elevation and as utilized in plural numbers to secure sections together having long contacting edges; Fig. 2 is a plan view of the arrangement in Fig. 1; Fig. 3 shows the invention utilized in a pilaster construction; Fig. 4 illustrates an application of the invention with a different form of rabbeting for the contiguous panels; Fig. 5 illustrates the joint as applicable to corners of different angles; Fig. 6 is a view of the mating plates per se in perspective; Fig. 7 shows in elevation a modified form of the joint; Fig. 8 is a plan view of the joint of Fig. 7; and Fig. 9 is a sectional view taken along the plane 9—9 of Fig. 8.

As depicted in Fig. 6 the device of the invention includes two mating plates 10 and 11 each of which is adapted to be secured on a structural section such as the panels 12 and 13 respectively of Figs. 1 and 2. For this purpose suitable holes 14 and 15 are provided in the respective plates adapted to receive screws 16 or whatever type of fastening means the materials may require. If metal partitions are employed these plates may be welded in place, for example. The plate 11 has a portion 17 for the reception of which the plate 10 is offset at 18 to provide a plate portion 19 adapted to bear against the part 17 of plate 11 in a direct face to face contact extending, it will be seen, over considerable area. The part 17 of plate 11 has a flat hook 20 projecting therefrom which, in the interests of convenience of manufacture, may be partially cut out of and stamped from the plate 11. Each plate, as a matter of fact, can be readily and economically made as a single stamping from sheet metal of any thickness suitable for the purpose. The plate 10 is formed with a recess or notched portion into which, upon assembly, the hook 20 projects and engages over the bottom edge 22 of the notch. The hook arrangement, therefore, holds the two plates in close contact and restrains the section members 12 and 13 from displacement in a corresponding direction.

Combined with the feature just described is a wedging means which serves to draw together the sections 12 and 13 in a direction substantially parallel to the plate portions 17 and 19. This wedging means takes the form of a projecting tongue having an inclined edge, engaging behind an abutment in the other plate. This tongue may conveniently comprise part of the plate area producing the notch 21, and accordingly, as specifically shown, the projecting tongue 24 is inclined along the edge 25 outwardly away from the bottom of the notch. As a result thereof when sections 12 and 13 are brought into proper relation and the section 12 moved upwardly in Fig. 1 relative to section 13 the hook 20 will ride down the incline 25 forcing the contiguous edges of the sections into a tight wedged engagement. In the home position the hook 20 prevents separation of the plate portions 17 and 19 but permits side movement thereof insofar as is necessary when the hook moves down the incline 25. The contiguous edges of the sections 12 and 13 will preferably be provided with some type of complemental rabbeting to contribute to the interlocking and tightness of the joint, each of Figs. 2, 3, 4 and 5 showing a different specific shape. Fig. 5, it will be noted, illustrates an independent auxiliary tongue 27 projecting into opposed channels of the sections 28 and 29.

The device, of which typical applications are illustrated, produces an exceptionally tight rigid joint comparable, after assembly of the sections, to an integral construction. The elements are interlocking and hold the sections against movement in any direction and against any angular displacement from that for which it may have been designed. The arrangement is very simple and compact and in assembled form is thin and flat lying close to the sections to which it is applied. If preferred, either or both plates may have a flange, such as that shown at 31, adapted to be imbedded in the section material. Likewise, for freedom of sharp edges, the outer plate portion 19 may be provided with a smooth curled edge 32.

The various uses to which this invention may be applied are too varied and numerous to attempt to relate. The parts to which the respective plates are attached are, for the most part, referred to as sections. It will be understood that as typical examples the invention may be utilized in sectional partitions or panel construction, furniture, shelving, pilasters, etc.

In the usual or common usages a series of two or more of the complete interlocking devices will be arranged along the joint of the adjoining sections as is shown, for example, in a fragmentary manner in Fig. 1.

Fig. 3 shows the invention incorporated in a pilaster construction in which the pilaster strip 34 may conveniently have a single plate 35 serving the purpose of two such plates as plate 11 of Fig. 6, with a hook 36 on each end corresponding to the hook 20 of Fig. 6. For purposes of convenience and appearance the interlocking joint device may be adapted to the outside of a corner, as shown at 37 in Fig. 4.

The invention is readily adaptable to the securing of sections together at any angle desired, as is illustrated in Fig. 5.

The materials of the sections, such as 12 and 13 of Figs. 1 and 2, may be metal, wooden, or any of the artificial compositions used in structural work of the nature under consideration.

Figs. 7, 8 and 9 illustrate the principles of the invention applied in a more extended form. In accordance with this construction the plate 38 is similar to plate 11 of Fig. 6 and is provided with a hook 39 corresponding to hook 20. Plate 40 is likewise similar to plate 10 but has, in addition, a hook 41 arranged in opposed relation to the hook 39 thereby affording an even more positive means for holding the plates in close contact and particularly effective to prevent any twisting action. The hook 41 and adjacent edge of the plate 39 may be made thin or tapered as shown, to result in a close smooth fit of the interlock. The transverse wedging effect will be obtained as before by an inclined tongue on one member or the other bearing against an abutment of the complemental plate, and, as illustrated, is exactly similar to that of Fig. 6.

If desired the contiguous edges 42 and 43 of the sections may be made plain, particularly when the double hook arrangement of Figs. 7 to 9 is employed.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A rigid interlocking means for separable sections comprising a plate on one section having a hook portion extending substantially parallel to said plate but spaced therefrom to define a slot; and a second plate on the contiguous section, said second plate being adapted to slide into said slot to prevent lateral displacement of said plates and having an inclined tongue projection adapted to engage the inner edge of said hook portion to wedge the sections toward each other and together.

2. A rigid separable joint for sectional construction comprising a first plate secured on one section having a bent over hook portion extending laterally and then substantially parallel to the face of said plate; and a second plate secured on the contiguous section adapted to contact face to face with said first plate with said hook portion extending over an edge of said second plate; and a projection on said second plate adapted to hook over a portion of said first plate said projection having an inclined edge operative upon assembling of the opposed sections to draw the edge of one section into direct wedging contact with the other section.

3. An interlocking joint for sectional construction comprising mating plates secured respectively on sections adapted to be assembled in contiguous relation; a hook on one of said plates arranged to engage over the other plate to secure the plates in contacting engagement against separation in one direction; and a wedge member on one of said plates arranged to engage behind an abutment on the other member to effect a sliding movement of said plates while held in contact by said hook to thereby draw the sections into rigid engagement along the contacting edge.

4. A rigid corner hook for separable sections adapted to be assembled and disassembled by endwise movement of the sections along the contacting edge comprising a first plate secured on one section; a second plate secured on the opposed section, said plates being arranged to contact face to face; a hook portion on one of said plates arranged to engage over an edge of the other plate to hold said plates in face to face contact to prevent relative displacement of said sections in one direction; and a projection on one of said plates adapted to slide behind an engaging portion of the other of said plates, said projection having an edge inclined with respect to the direction of said endwise movement to draw the sections together upon assembling and to thereafter prevent displacement of said sections in a direction transverse to said first mentioned direction.

5. An interlocking joint for rigidly securing together separable sections comprising a first plate secured on one of said sections; a second plate secured on the opposed section, said plates having contacting faces in parallel arrangement; a hook portion on one of said plates engaging over the other plate to hold said plate faces in contact; and a projection on one of said plates inclined outwardly toward the other plate and section on its inner edge adapted to engage over a portion of said last named other plate to draw the plates together and correspondingly to wedge together the opposed sections in a direction substantially parallel to said contacting faces.

6. A rigid but readily separable interlocking joint for sectional construction comprising a first relatively thin plate secured on one section; a second relatively thin plate secured on the contiguous section, said plates having substantial face portions adapted to be arranged in parallel contacting relation; a flat bent over hook extending from said portion of one of said plates adapted upon sliding movement of said sections to engage over said portion of the other plate to hold said plate portions in contact; and a tongue projecting from said other plate in the plane of its face portion and having an edge adjacent the edge of said hook nearest the section on which said hook is secured, said edge on said tongue being inclined to draw the opposed sections into contact by a wedging action upon assembly thereof.

7. A rigid readily separable interlocking joint for sectional construction comprising a first relatively thin plate secured on one of said sections; a second relatively thin plate secured on the contiguous section, said plates having substantial face portions adapted to be arranged in parallel face to face contact, said portion of said first plate having a flat hook bent over and extending parallel thereto to engage over the said opposed face portion of said second plate, and said second plate having a recess adapted to receive said hook with said hook extending over the bottom of said recess, the edge of said recess nearest to the opposed section being inclined outwardly away from the bottom of the recess to provide a means for wedging the opposed sections together upon assembly.

8. An interlocking joint for sectional construction comprising mating plates secured respectively on sections adapted to be assembled in contiguous relation; a hook on a first one of said plates; a hook on the other of said plates, said hooks being in opposed relation and engaging over the mating plate respectively to secure the plates in close face contacting relation; and a tongue on one of said plates having an inclined edge engageable behind an abutment of the other plate to draw the sections toward each other and together in a direction transverse to said hooks upon assembly of the sections.

9. An interlocking joint comprising mating plates; a flat hook on a first one of the plates extending parallel to the plate, the other plate having a recess into which said hook is adapted to project and to engage over the bottom edge of said recess upon relative sliding movement between said plates to hold said plates in face to face contact, and the edge of said recess nearest said first plate being inclined outwardly and away from the bottom of the recess whereby said sliding moment also serves to draw said plates together laterally along said contacting faces.

10. A rigid but readily separable interlocking joint for sectional construction comprising a first relatively thin plate adapted to be secured on one section; a second relatively thin plate adapted to be secured on the contiguous section, said plates having substantial face portions adapted to be arranged in parallel contacting relation; a flat bent over hook extending from said portion of a first one of said plates adapted upon relative sliding movement of said plates to engage over an edge of said portion of the other plate to hold said plate portions in face to face contact; and a flat tongue projecting from said other plate having an edge engageable around the edge of said hook said tongue edge being inclined outwardly and away from the plate upon which it is arranged and toward said first plate whereby the plates are drawn laterally toward each other upon relative sliding engagement.

CONWALL B. HANSEN.